United States Patent
Okahashi

(10) Patent No.: US 7,395,028 B2
(45) Date of Patent: Jul. 1, 2008

(54) SWITCHING APPARATUS AND SATELLITE ANTENNA SWITCHING APPARATUS

(75) Inventor: Tetsuhide Okahashi, Kashihara (JP)

(73) Assignee: Sharp Kabushi Kaisha, Osaka (JP)

( * ) Notice: Subject to any disclaimer, the term of this patent is extended or adjusted under 35 U.S.C. 154(b) by 894 days.

(21) Appl. No.: 10/777,037

(22) Filed: Feb. 13, 2004

(65) Prior Publication Data

US 2004/0196174 A1    Oct. 7, 2004

(30) Foreign Application Priority Data

Feb. 27, 2003    (JP) .............................. 2003-050455

(51) Int. Cl.
*H04B 7/185*   (2006.01)
*H04B 1/18*    (2006.01)
*H01H 63/00*   (2006.01)

(52) U.S. Cl. .................... 455/3.02; 455/248.1; 455/320; 455/330; 455/13.3; 333/124; 333/17.3; 333/32

(58) Field of Classification Search ............... 455/3.02, 455/13.3, 107, 248.1, 320, 330; 343/850; 333/124, 17.3, 112, 118, 32, 253, 263

See application file for complete search history.

(56) References Cited

U.S. PATENT DOCUMENTS 4,855,614 A * 8/1989 Maitre .................... 455/3.02 X

FOREIGN PATENT DOCUMENTS

JP      H4-159824      6/1992
JP      2000-324467    11/2000

* cited by examiner

*Primary Examiner*—Philip J Sobutka
(74) *Attorney, Agent, or Firm*—Nixon & Vanderhye P.C.

(57) ABSTRACT

A satellite antenna switching apparatus has LNB ports to which LNBs are connected, receiver ports to which receivers that exchange signals with the LNBs are connected, cascade ports to which another switching apparatus is cascade-connected, and impedance circuits that function as means for detecting the signals exchanged between the LNBs and receivers. The impedance circuits provide impedances according to the connection states of the cascade ports, and are electrically disconnected from the signal paths when another switching apparatus is cascade-connected to the cascade ports. With this configuration, the satellite antenna switching apparatus suffers from less attenuation of the exchanged signals even in a cascade connection of a plurality of stages of switching apparatuses.

9 Claims, 5 Drawing Sheets

US 7,395,028 B2

SWITCHING APPARATUS AND SATELLITE ANTENNA SWITCHING APPARATUS

This nonprovisional application claims priority under 35 U.S.C. § 119(a) on Patent Application No. 2003-050455 filed in Japan on Feb. 27, 2003, the entire contents of which are hereby incorporated by reference.

BACKGROUND

1. Field of the Technology

The exemplary embodiment described herein relates to a switching apparatus for controlling the interconnection among a plurality of devices. More particularly, the exemplary embodiment relates to a satellite antenna switching apparatus, as installed between a converter that performs a predetermined conversion operation on a signal received by a satellite antenna and a receiver that exchanges signals with the converter, for controlling the interconnection between such a converter and such a receiver on a one-to-many or many-to-many basis.

2. Description of the Prior Art

In reception of satellite broadcast or satellite communication, a high-frequency signal received by a satellite antenna is fed from an LNB (low-noise block converter), which is fitted to the satellite antenna, by way of a coaxial cable or the like to a receiver (for example, a STB (set-top box)). In a case where the received signal outputted from a single LNB is distributed among a plurality of receivers, or in a case where one of the received signals outputted from a plurality of LNBs is selected to be fed to a single receiver, or in a case where the received signals outputted from a plurality of LNBs are distributed among a plurality of receivers in a desired manner, a satellite antenna switching apparatus (hereinafter referred to as a "switch box") is installed between the LNB(s) and receiver(s) for the purpose of controlling the interconnection between those devices (for example, as disclosed in Japanese Patent Application Laid-Open No. H4-159824).

Some models of conventional switch boxes have, as well as LNB ports to which LNBs are connected and receiver ports to which receivers are connected, a cascade port to which an LNB port of a switch box of the same configuration can be connected. This permits a cascade connection of a plurality of switch boxes.

It is true that a switch box configured as described above permits the number of receivers that share the same LNB to be increased easily simply by connecting another switch box to the cascade port so that the switch boxes are cascade-connected. This makes this type of switch box very useful.

However, with the switch box configured as described above, due to its circuit configuration, when a plurality of them are cascade-connected, the signals exchanged between the receivers and LNBs are attenuated so severely as to make, in the worst case, their detection impossible. Now, how this problem occurs will be explained in detail with reference to FIG. 4. FIG. 4 is a circuit diagram showing the configuration of a principal portion (signal exchange portion) of a conventional switch box. In this figure, for simplicity's sake, it is assumed that only one LNB 31 and one receiver 21 are connected to a first-stage switch box 110, and that only one receiver 22 is connected to a second-stage switch box 120.

When a command signal is fed from the receiver 21 to the LNB 31, according to this command signal, a microcomputer m1 turns a transistor n1 on and off so as to vary the current that flows through an impedance circuit z1 that is provided for signal detection. As a result of this control, the potential at a node a1 pulsates according to the command signal, and thus the command signal is, in a form superimposed on a direct-current voltage fed from the receiver 21, fed out via an LNB port LP1. In this way, the LNB 31 is fed with electric power along with the command signal.

On the other hand, when a command signal is fed from the receiver 22 to the LNB 31, according to this command signal, a microcomputer m2 turns a transistor n2 on and off so as to vary the current that flows through an impedance circuit z2. As a result of this current control, the potential at a node a2 pulsates according to the command signal, and thus the command signal is, in a form superimposed on a direct-current voltage fed from the receiver 22, fed out via an LNB port LP2. The voltage fed out via the LNB port LP2 is fed to the cascade port CP1 of the switch box 110, and only the alternating-current component of this voltage is fed through a coupling capacitor c1 to the node a1. Thus, the command signal is, in a form superimposed on the direct-current voltage fed from the receiver 21, fed out via the LNB port LP1.

When these conventional switch boxes 110 and 120 are cascade-connected, however, the impedance circuits z1 and z2, which are both grounded when considered on an alternating-current basis, are connected in parallel with each other (see the equivalent circuits shown in FIGS. 5A and 5B), and thus, assuming that the impedance circuits z1 and z2 are designed to have equal impedances, the actual impedance at the nodes a1 and a2 are reduced to half the impedance as designed. On the other hand, the collector currents of the transistors n1 and n2 are previously determined according to their peripheral constants, and therefore, when the impedance is reduced to a half as described above, the voltage drop at the nodes a1 and a2 (i.e., the amplitude of pulse signals) is accordingly reduced to a half. On the same principle, when n switch boxes are cascade-connected, the amplitude of pulse signals is reduced to 1/n, making it impossible, in the worst case, to detect the exchanged signals as described above.

SUMMARY

A feature of the exemplary embodiment presented herein is to provide a switching apparatus, and in particular a satellite antenna switching apparatus, that does not cause attenuation of exchanged signals even when used in a cascade connection of a plurality of stages of switch boxes.

To achieve the above feature, according to an exemplary embodiment a switching apparatus, in particular a satellite antenna switching apparatus, is provided with: a first port (LNB port) to which a first device (LNB) is connected; a second port (receiver port) to which a second device (receiver) that exchanges a signal with the first device is connected; a third port (cascade port) to which another switching apparatus is cascade-connected; and an impedance circuit that functions as a means for detecting the signal exchanged between the first and second devices. Here, the impedance circuit provides an impedance according to the connection state of the third port, and is electrically disconnected from the signal path when the other switching apparatus is cascade-connected to the third port.

BRIEF DESCRIPTION OF THE DRAWINGS

This and other features of an exemplary embodiment will become clear from the following description, taken in conjunction with the preferred embodiments with reference to the accompanying drawings in which.

DESCRIPTION OF THE PREFERRED EMBODIMENTS

Figure 1A:
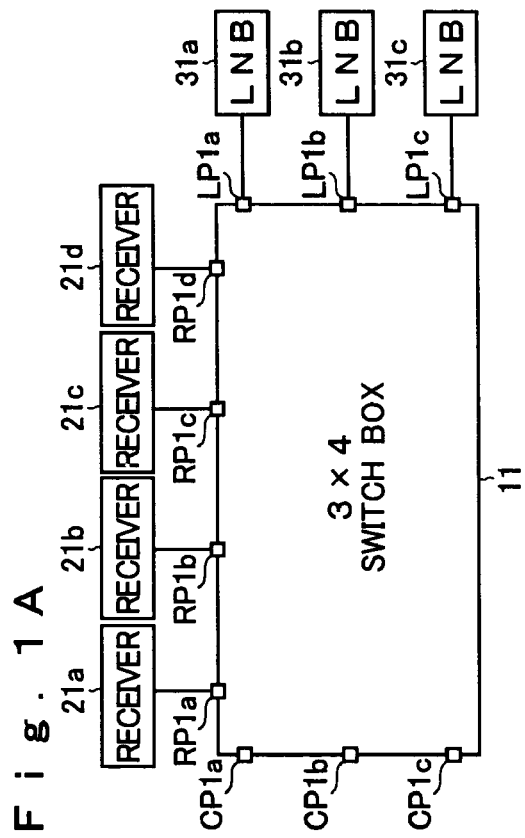
FIGS. 1A and 1B are diagrams showing examples of how a switch box embodying an exemplary embodiment is installed.
Figure 1B:
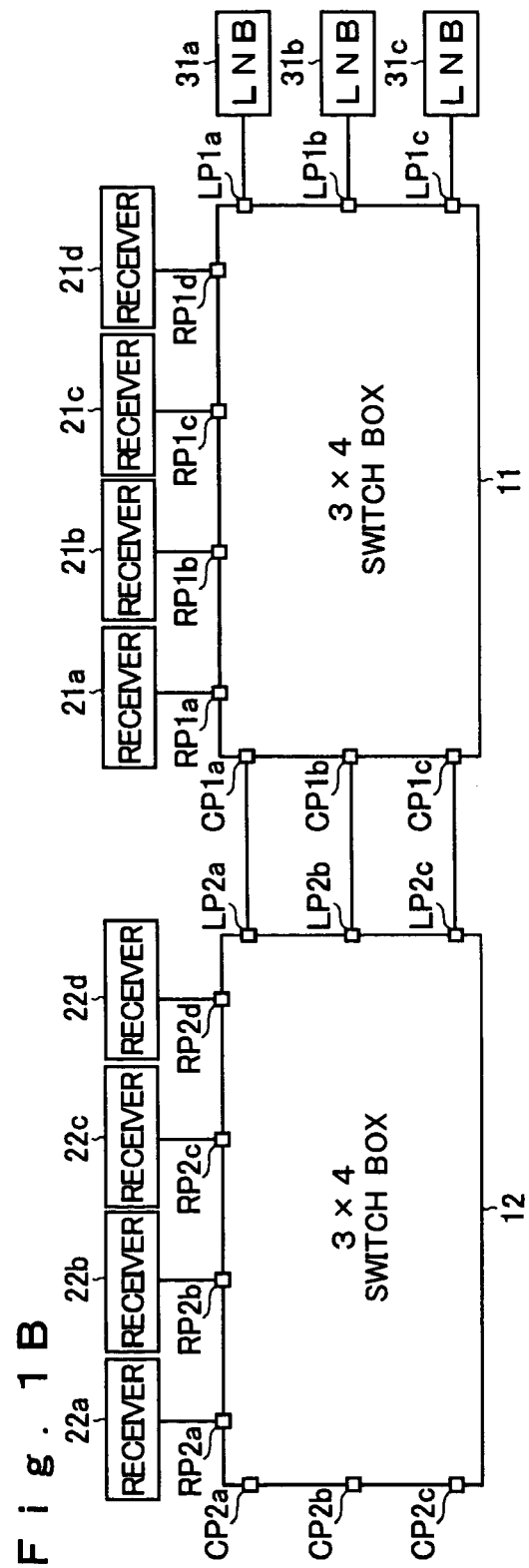

FIGS. 1A and 1B are diagrams showing how a switch box embodying an exemplary invention is installed. In FIG. 1A, a switch box 11 is provided with LNB ports LP1a to LP1c to which are connected LNBs 31a to 31c that perform a predetermined conversion operation on signals received by satellite antennas (not illustrated); and receiver ports RP1a to RP1d to which are connected receivers 21a to 21d that exchange signals with the LNBs 31a to 31c, and to which direct-current voltages are applied from those receivers 21a to 21d. Thus, this configuration permits the interconnection among LNBs and receivers to be controlled in such a way that a maximum of three LNBs can be shared among a maximum of four receivers.

The switch box 11 is further provided with cascade ports CP1a to CP1c to which are connected LNB ports LP2a to LP2c of another switch box 12 of the same configuration. This permits the switch box 12 to be cascade-connected to the switch box 11 as shown in FIG. 1B, and thereby permits the number of receivers that share the LNBs 31a to 31c to be increased as desired.

The switch boxes 11 and 12 and the LNBs 31a to 31c are all controlled by a microcomputer so as to perform various operations according to command signals (pulse signals) fed from the receivers 21a to 21d and 22a to 22d. For example, the switch boxes 11 and 12 control the interconnection between the receives 21a to 21d and 22a to 22d and the LNBs 31a to 31c so that the former can obtain information from a desired one of the latter. Moreover, the switch boxes 11 and 12 provide signal transmission paths between the receivers and LNBs to permit two-way communication among them whereby command signals are transmitted from the receivers 21a to 21d and 22a to 22d to the LNBs 31a to 31c and received signals are transmitted from the LNBs 31a to 31c to the receivers 21a to 21d and 22a to 22d.

Figure 2:
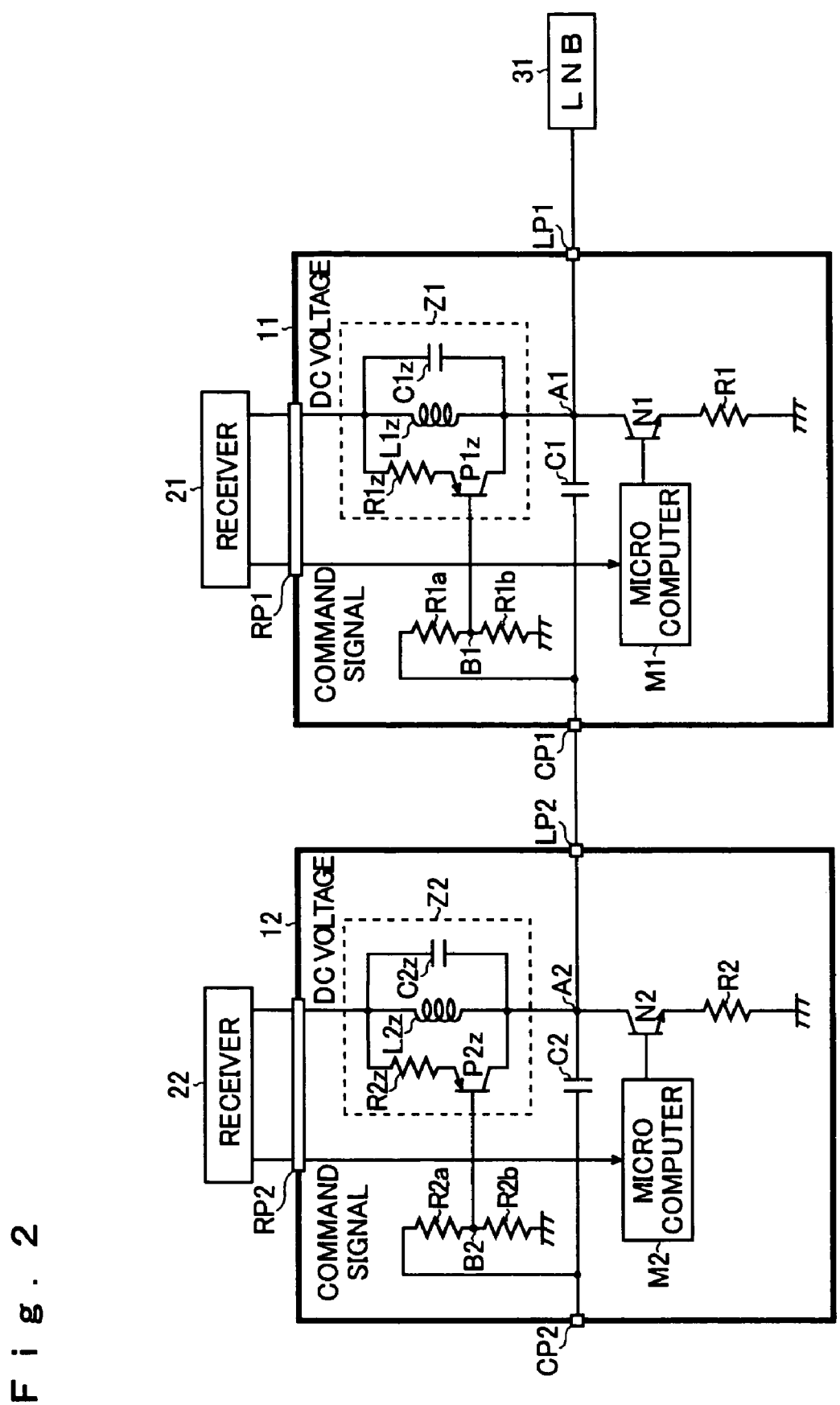
FIG. 2 is a circuit diagram showing the configuration of a principal portion of the switch boxes 11 and 12.

FIG. 2 is a circuit diagram showing the configuration of a principal portion (signal exchange portion) of the switch boxes 11 and 12. In this figure, for simplicity's sake, it is assumed that only the LNB 31 and the receiver 21 are connected to the switch box 11, and that only the receiver 22 is connected to the switch box 12.

As shown in this figure, the receiver ports RP1 and RP2 are connected via impedance circuits Z1 and Z2, provided for signal detection, to the LNB ports LP1 and LP2, so that the direct-current voltages fed from the receivers 21 and 22 are transmitted by way of those paths to the LNB ports LP1 and LP2. The receiver ports RP1 and RP2 are connected also to the input terminals of microcomputers M1 and M2, so that the command signals fed from the receivers 21 and 22 are transmitted by way of those paths to the microcomputers M1 and M2. The cascade ports CP1 and CP2 are connected via coupling capacitors C1 and C2 to the LNB ports LP1 and LP2.

The nodes A1 and A2 between the impedance circuits Z1 and Z2 and the LNB ports LP1 and LP2 are connected to the collectors of npn-type bipolar transistors N1 and N2, respectively. The emitters of the transistors N1 and N2 are grounded via resistors R1 and R2, respectively. The bases of the transistors N1 and N2 are connected to the output terminals of microcomputers M1 and M2, respectively. Here, the transistors N1 and N2 are provided as a means for superimposing the command signals on the direct-current voltages fed from the receivers 21 and 22, because the microcomputer M1 and M2 themselves are not furnished with such a function.

In these switch boxes 11 and 12 embodying the invention, the impedance circuits Z1 and Z2 are each designed not as a fixed resistance element but as a parallel resonance circuit having a resistor circuit, an inductor L1z or L2z, and a capacitor C1z or C2z connected in parallel with one another, wherein the resistor circuit has a resistor R1z or R2z connected in series with a pnp-type bipolar transistor P1z or P2z. The base of the transistor P1z is connected to the node B1 between resistors R1a and R1b that are connected in series between the cascade port CP1 and the ground line, and the base of the transistor P2z is connected to the node B2 between resistors R2a and R2b that are connected in series between the cascade port CP2 and the ground line.

With this configuration, when the switch box 12 is not cascade-connected to the switch box 11, and therefore no direct-current voltage is applied to the cascade port CP1, the potential at the node B1 is low. This turns the transistor P1z on, and thus causes the resistor R1z to be incorporated in the parallel resonance circuit. By contrast, when the switch box 12 is cascade-connected to the switch box 11, and therefore a direct-current voltage is applied from the LNB port LP2 to the cascade port CP1, the potential at the node B1 is high. This turns the transistor P1z off, and thus causes the resistor R1z to be disconnected from the parallel resonance circuit. It should be noted that, irrespective of whether the switch boxes 11 and 12 are cascade-connected together or not, no direct-current voltage is applied to the cascade port CP2 at the very end, and therefore the potential at the node B2 is always low. This keeps the transistor P2z on, and thus leaves the resistor R2z incorporated in the parallel resonance circuit.

In the impedance circuits Z1 and Z2 configured as described above, their resonance frequency when the transistors P1a and P2z are on (i.e., when the resistors R1z and R2z are incorporated in the parallel resonance circuits) is set equal to the pulse frequency of the command signals that are to be fed to the LNB 31, and their impedance when they are resonating is determined by the resistances of the resistors R1z and R2z. Moreover, the impedance circuits Z1 and Z2 are so designed that their impedances are infinitely high when the transistors P1a and P2z are off (i.e., when the resistors R1z and R2z are disconnected from the parallel resonance circuits).

For example, in a case where the pulse frequency of the command signals is 22 [kHz], it is advisable to set the resistance of the resistor circuits (the sum of the resistance of the resistor R1z or R2z and the on-state resistance of the transistor P1z and P2z) to be 15 [Ω], the self inductance of the inductors L1z and L2z to be 820 [μH], and the capacitance of the capacitors C1z and C2z to be 0.068 [μF].

Figure 3A:
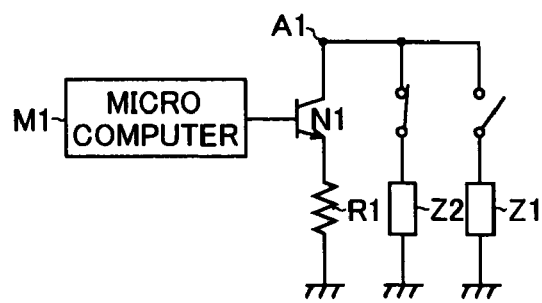
FIGS. 3A and 3B are equivalent circuit diagrams of the switch boxes 11 and 12 as considered on an alternating-current basis.
Figure 3B:
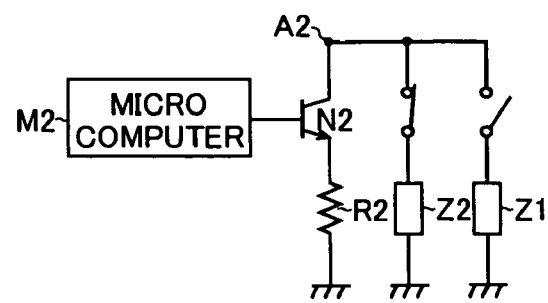
Figure 4:
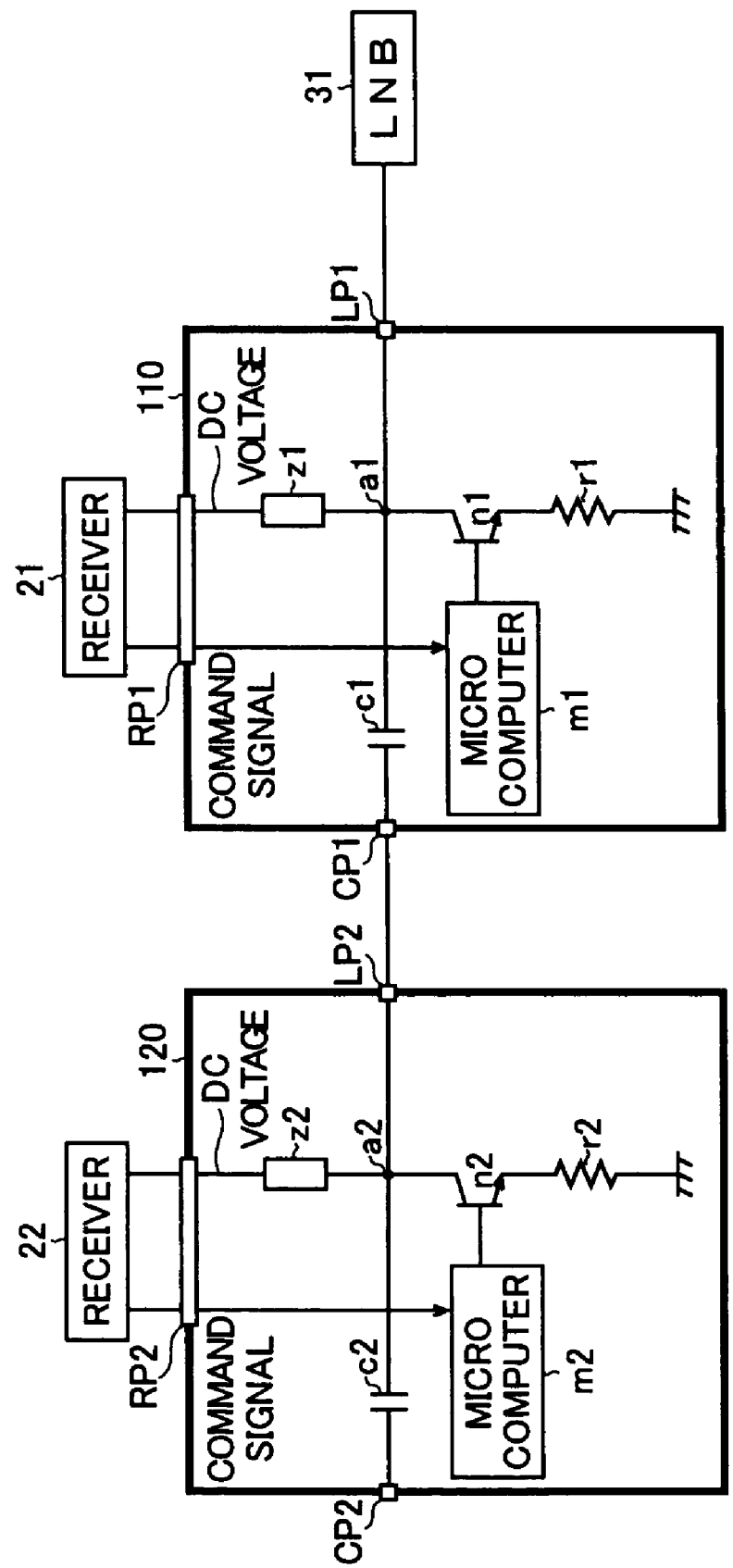
FIG. 4 is a circuit diagram showing the configuration of a principal portion of a conventional switch box.
Figure 5A:
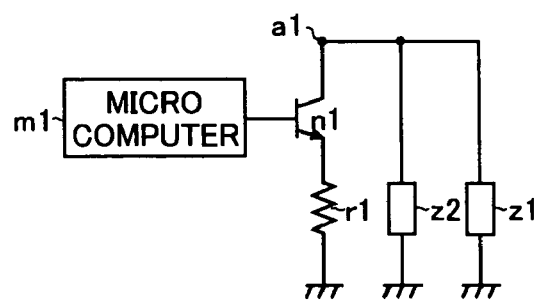
FIGS. 5A and 5B are equivalent circuit diagrams of a conventional switch box as considered on an alternating-current basis.
Figure 5B:
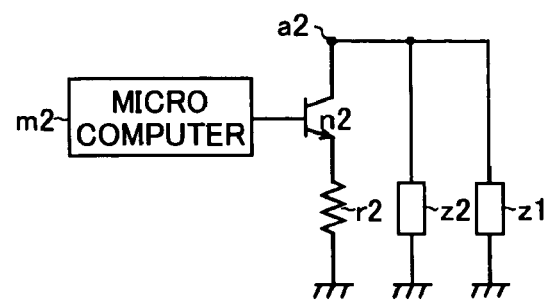

With this configuration, irrespective of how many stages of switch boxes are cascade-connected together, it is possible to give the desired impedance only to the impedance circuit of the switch box at the very end (in the figure, the impedance circuit Z2 of the switch box 12), and to electrically disconnect the impedance circuits of all the other switch boxes (in the figure, the impedance circuit Z1 of the switch box 11) (see equivalent circuits shown in FIGS. 3A and 3B). Thus, even when a plurality of stages are cascade-connected together, the signals exchanged between receivers and LNBs are less attenuated, making it possible to perform communication in a satisfactory manner.

Moreover, in the impedance circuits Z1 and Z2 configured as described above, their impedance when the transistors P1z and P2z are on is equal to the desired value only at the pulse frequency of the command signals, and is lower to any other frequency components. In particular, for a direct-current component, the impedance circuits Z1 and Z2 always provide an extremely low resistance ascribable to the inductors L1z and L2z irrespective of whether the transistors P1z and P2z are on or off. This is advantageous in eliminating the noise contained in the command signals, and in preventing the attenuation of the direct-current voltage fed to the LNB 31.

Now, how the switch boxes 11 and 12 configured as described above actually operate when they are cascade-connected together (i.e., when the transistor P1z is off and the transistor P2z is on) will be described in detail.

First, a description will be given of a case where a command signal is fed from the receiver 21 to the LNB 31. In this case, the microcomputer M1 turns the transistor N1 on and off according to the command signal fed from the receiver 21 so as to vary the current that flows through the impedance circuit Z2. As a result of this control, the potential at the node A2 pulsates according to the command signal, and thus the command signal is, in a form superimposed on the direct-current voltage fed from the receiver 22, fed out via the LNB port LP2. The voltage fed out via the LNB port LP2 is fed to the cascade port CP1 of the switch box 11, and only the alternating-current component of this voltage is fed through the coupling capacitor C1 to the node A1. Thus, the command signal is, in a form superimposed on the direct-current voltage fed from the receiver 21, fed out via the LNB port LP1. In this way, the command signal is, along with the supply voltage, fed to the LNB 31.

Next, a description will be given of a case where a command signal is fed from the receiver 22 to the LNB 31. In this case, the microcomputer M2 turns the transistor N2 on and off according to the command signal fed from the receiver 22 so as to vary the current that flows through the impedance circuit Z2. As a result of this control, the potential at the node A2 pulsates according to the command signal, and thus the command signal is, in a form superimposed on the direct-current voltage fed from the receiver 22, fed out via the LNB port LP2. The voltage fed out via the LNB port LP2 is fed to the cascade port CP1 of the switch box 11, and only the alternating-current component of this voltage is fed through the coupling capacitor C1 to the node A1. Thus, the command signal is, in a form superimposed on the direct-current voltage fed from the receiver 21, fed out via the LNB port LP1. In this way, the command signal is, along with the supply voltage, fed to the LNB 31.

The exemplary embodiment described above deals with a case where an example embodiment is applied to a satellite antenna switching apparatus. It should be understood, however, that the present invention finds wide application in switching apparatuses in general, i.e., in any other types of switching apparatuses than the one specifically discussed above, that control the interconnection among a plurality of devices.

As described above, with a switching apparatus, in particular a satellite antenna switching apparatus, according to the present invention, even when a plurality of stages of switching apparatuses are cascade-connected together, the exchanged signals are less attenuated, and thus it is possible to perform communication in a satisfactory manner.

What is claimed is:

1. A switching apparatus comprising:
   a first port to which a first device is connected;
   a second port to which a second device that exchanges a signal with the first device is connected;
   a third port to which another switching apparatus is cascade-connected;
   an impedance circuit configured to detect the signal exchanged between the first and second devices,
   wherein the impedance circuit is configured to provide an impedance according to a connection state of the third port, and is electrically disconnected from a signal path when the other switching apparatus is cascade-connected to the third port.

2. A switching apparatus comprising:
   x first ports
      to which first devices are connected;
   impedance circuits;
   y second ports
      that are connected via the impedance circuits to the first ports,
      to which second devices are connected that exchange signals with the first devices, and
      to which direct-current voltages are applied from the second devices;
   coupling capacitors;
   x third ports
      that are connected via the coupling capacitors to the first ports, and
      to which first ports of another switching apparatus are connected; and
   signal superimposing circuits
      that are configured to vary currents flowing through the impedance circuits according to command signals from the second devices in order to feed to the first ports the command signals in a form superimposed on the direct-current voltages applied to the second ports,
   wherein, as x-to-y interconnection between the first and second devices is controlled, the impedance circuits are configured to provide impedances according to connection states of the third ports.

3. A switching apparatus as claimed in claim 2,
   wherein the impedance circuits are configured to provide the impedances according to voltage application states of the third ports.

4. A switching apparatus as claimed in claim 3,
   wherein the impedance circuits are each a parallel resonance circuit comprising a resistor circuit, an inductor, and a capacitor connected in parallel with one another, the resistor circuit comprising a resistor connected in series with a switch circuit that opens and closes according to the voltage application state of the corresponding third port.

5. A switching apparatus as claimed in claim 4,
   wherein the impedance circuits are each so designed that a resonance frequency thereof when the switch circuit is in an on state is equal to a pulse frequency of the command signals so that, when the impedance circuits are resonating, the impedance thereof is determined by the resistance of the resistor and that, when the switch circuit is in an off state, the impedance to the command signals is infinitely high.

6. A satellite antenna switching apparatus comprising:
   x converter ports
      to which are connected converters that are configured to perform a predetermined conversion operation on signals received via satellite antennas;
   impedance circuits;
   y receiver ports
      that are connected via the impedance circuits to the converter ports, to which are connected receivers that are configured to exchange signals with the converters, and to which are applied direct-current voltages from the receivers;

coupling capacitors;

x cascade ports that are connected via the coupling capacitors to the converter ports, and to which are connected converter ports of another satellite antenna switching apparatus; and signal superimposing circuits that are configured to vary currents flowing through the impedance circuits according to command signals from the receivers in order to feed to the converter ports the command signals in a form superimposed on the direct-current voltages applied to the receiver ports, wherein, as x-to-y interconnection between the converters and the receivers is controlled, the impedance circuits are configured to provide impedances according to connection states of the cascade ports.

7. A satellite antenna switching apparatus as claimed in claim 6, wherein the impedance circuits are configured to provide the impedances according to voltage application states of the cascade ports.

8. A satellite antenna switching apparatus as claimed in claim 7, wherein the impedance circuits are each a parallel resonance circuit comprising a resistor circuit, an inductor, and a capacitor connected in parallel with one another, the resistor circuit comprising a resistor connected in series with a switch circuit that opens and closes according to the voltage application state of the corresponding cascade port.

9. A satellite antenna switching apparatus as claimed in claim 8, wherein the impedance circuits are each so designed that a resonance frequency thereof when the switch circuit is in an on state is equal to a pulse frequency of the command signals so that, when the impedance circuits are resonating, the impedance thereof is determined by the resistance of the resistor and that, when the switch circuit is in an off state, the impedance to the command signals is infinitely high.

* * * * *